United States Patent [19]

Wolff

[11] Patent Number: 4,960,510

[45] Date of Patent: Oct. 2, 1990

[54] SCREENING APPARATUS HAVING A SCREEN GRID WITH A PLURALITY OF EXCHANGEABLE SCREEN ELEMENTS

[75] Inventor: Kurt Wolff, Dinslaken, Fed. Rep. of Germany

[73] Assignee: Steinhaus GmbH, Mulheim, Fed. Rep. of Germany

[21] Appl. No.: 205,885

[22] Filed: Jun. 13, 1988

[30] Foreign Application Priority Data

Jun. 26, 1987 [DE] Fed. Rep. of Germany ....... 3721108
Sep. 23, 1987 [DE] Fed. Rep. of Germany ....... 8712824

[51] Int. Cl.$^5$ ............................................. B07B 1/46
[52] U.S. Cl. ................................. 209/405; 209/395; 209/399
[58] Field of Search ............... 209/395, 399, 403, 405, 209/319, 352, 313, 397, 393

[56] References Cited

U.S. PATENT DOCUMENTS

| 4,120,784 | 10/1978 | Hassall | 209/399 |
| 4,141,821 | 2/1979 | Wolff | 209/405 |
| 4,265,742 | 5/1981 | Bücker et al. | 209/399 |
| 4,278,535 | 7/1981 | Wolff | 209/399 |
| 4,383,919 | 5/1983 | Schmidt | 209/399 |
| 4,409,099 | 10/1983 | Wolff | 209/399 |
| 4,563,270 | 1/1986 | Wolff | 209/379 |
| 4,661,245 | 4/1987 | Rutherford et al. | 209/405 X |
| 4,670,136 | 6/1987 | Schmidt et al. | 209/403 |
| 4,673,251 | 6/1987 | Wolff | 52/309.15 |
| 4,752,512 | 6/1988 | Wolff | 428/58 |

FOREIGN PATENT DOCUMENTS

| 2706277 | 8/1978 | Fed. Rep. of Germany | 209/399 |
| 2754044 | 4/1979 | Fed. Rep. of Germany | 209/399 |
| 3031057 | 2/1982 | Fed. Rep. of Germany | 209/405 |
| 74/5092 | 7/1975 | South Africa | 209/399 |
| 75/6585 | 10/1975 | South Africa | 209/399 |
| 905179 | 9/1962 | United Kingdom | 209/395 |

Primary Examiner—Donald T. Hajec
Attorney, Agent, or Firm—Pollock, Vande Sande & Priddy

[57] ABSTRACT

A screening apparatus has a screen grid including plurality of exchangeable elements, each having a screen surface with sieve openings. The screen elements are placed in direct contact with each other to form a continuous screen, sifting surface and are removably connected through separators on intermediate cross-pieces. The separators are connected to the bottoms of the screen elements and extend at such a distance beyond the underside of screen surface so as to form an inwardly facing open passage space for sifted material below the screen, sifting surface in the area of connection of the screen elements to the separators such that the active sifting surface extends to the area of the supported marginal zones.

22 Claims, 4 Drawing Sheets

U.S. Patent    Oct. 2, 1990    Sheet 1 of 4    4,960,510
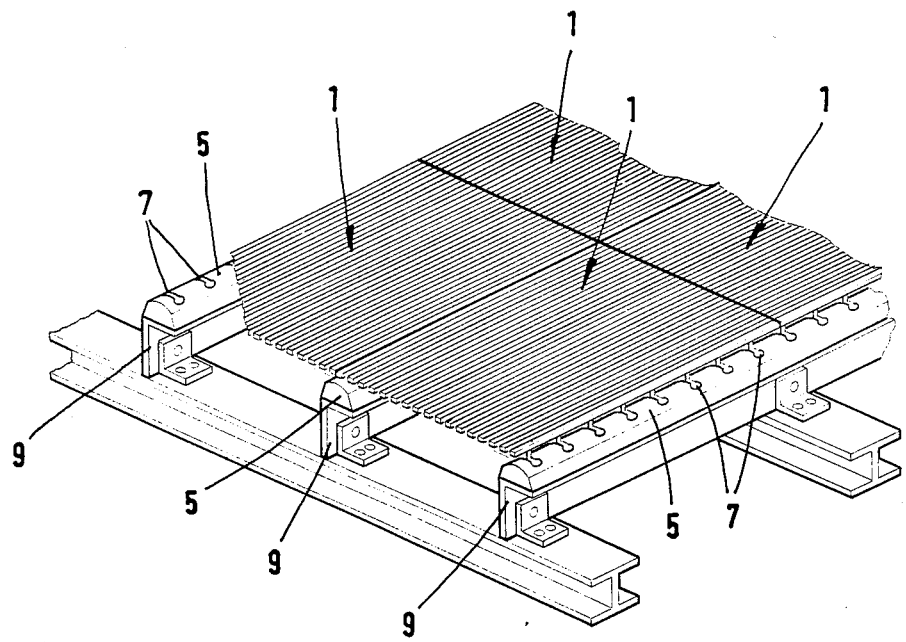
FIG. 1
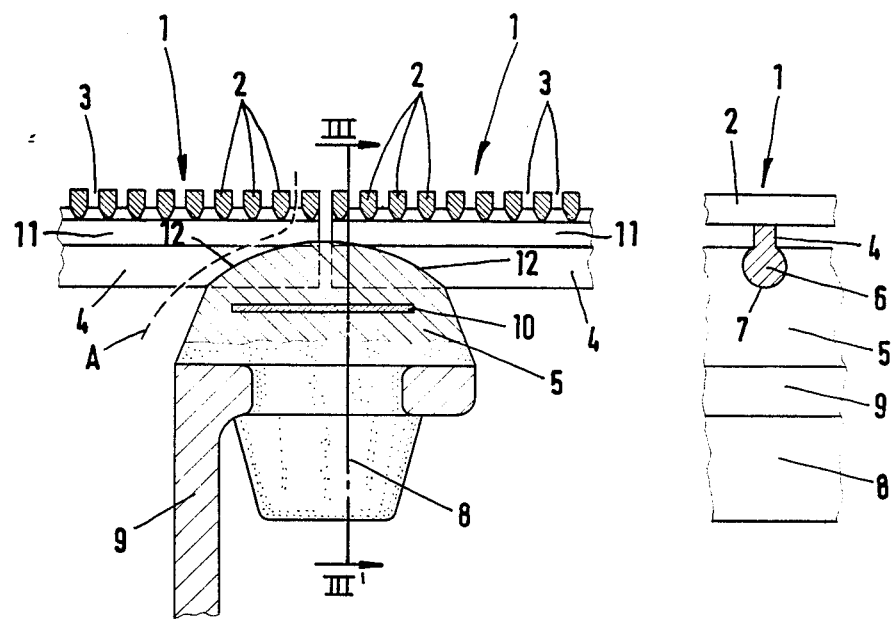
FIG. 2
FIG. 3

SCREENING APPARATUS HAVING A SCREEN GRID WITH A PLURALITY OF EXCHANGEABLE SCREEN ELEMENTS

BACKGROUND OF THE INVENTION

The present invention relates to a screening apparatus having a number of exchangeable screen elements, each of which has a screen surface with sieve-openings. The screen surfaces have a basic square or rectangular shape, and are placed onto intermediate cross-pieces along both their opposite and also longitudinal edges. The cross-pieces are attached to a carrier-framework.

The screening apparatus of this type is known from DE-A1-33-07-961. The attachment of the screen-grid or perforated bottom forming the sieve-surface to the intermediate cross-pieces is accomplished by means of profiled stops cooperating with the intermediate cross-pieces to hold the sieve screens or perforated bottoms. This structure involves two significant disadvantages. For one thing, sieve-lines form on the top-side of the entire screen-grid, due to the profile stops, which protrude upwards, since the profiled stops must naturally be located in the direction of forward motion of the sifting machine, and can not be covered by the sifting material as long as the thickness of the layer on the screen-surface does not exceed the height of the profiled stops which protrude upwards. Particularly with zonal application of sifting material, this prevents utilization of the entire breadth of the screen-grid. Moreover, active screen-surface is lost at the places where the sifting screen or the perforated bottom is held, which reduces capacity.

SUMMARY OF THE INVENTION

The present inventors thus face the problem of making the active sifting surface of a screen-grid in the screening apparatus as large as possible by incorporating the marginal resting areas of the screen elements into the active sifting surface, and avoiding protruding attachment elements on the top side of the screen surface.

This problem is solved with a screening apparatus of the present invention which has the sieve elements of the screen-grid directly contacting with one another at the top side of their sifting surfaces, to form a continuous surface provided with sieve openings, and having separators on their undersides, which are directly or indirectly boshed onto the intermediate cross-pieces in a removable way, and which have below them such a distance beyond the underside of the associated sieve-surface that an inward-facing open passage-space for the sifted material exists below the sifting surface in the supporting area.

The particular advantage of the present invention is that the active, sifting-surface of the screen elements of the screen-grid is extended even to those edges at which the sieve elements are supported, since a passage or transfer space for the sifted material is provided there below the sifting surface. Since the screen elements are removably boshed to the carrier framework, solely by way of the separators or retaining bars on their lower sides, there are no protruding attachment means on the top side of the sifting surface. By connecting the screen elements with the carrier framework removably in such a way that they connect to one another with their longitudinal edges, and, if necessary, with their transverse edges as well, a screening grid is obtained with a continuous surface provided with sieve-openings and with no dead zones.

For this purpose, the screen elements can be boshed onto the intermediate cross-pieces either directly by means of the separators, or indirectly, using the retaining bars. The separators advantageously have retaining bars so designed that in each case adjacent screen elements can be placed together on one intermediate cross-piece. The invention is particularly suitable for flat, self-supporting screen elements such as weld-crack screen elements or screen elements consisting essentially of perforated sheet-metal, so that such perforated steel element may also be formed into screening apparatus having a screen-grid with continuous overall sifting surfaces. This ensures, as in the case of previously-known screening apparatus with screen elements made of plastic or rubber, that the steel screen elements can be easily exchanged. In principle, however, the inventive permeability of the screen elements in the area of the supported marginal zones may be utilized by the screen elements for expanding the active sifting surfaces, even when such work materials as cast steel, plastic, hard ceramics, rubber of combinations of these are used.

The present invention will in the following be explained in greater detail with reference to the accompanying drawings, in which:

BRIEF DESCRIPTION OF THE DRAWINGS

FIG. 1 shows a perspective top view of a section of a screening apparatus according to the present invention.

FIG. 2 shows a cross-section of the screening apparatus of FIG. 1, in the area of two adjacent screen elements;

FIG. 3 shows a longitudinal section of one of the two screen elements;

DETAILED DESCRIPTION OF THE PREFERRED EMBODIMENT(S)

Figure 4:
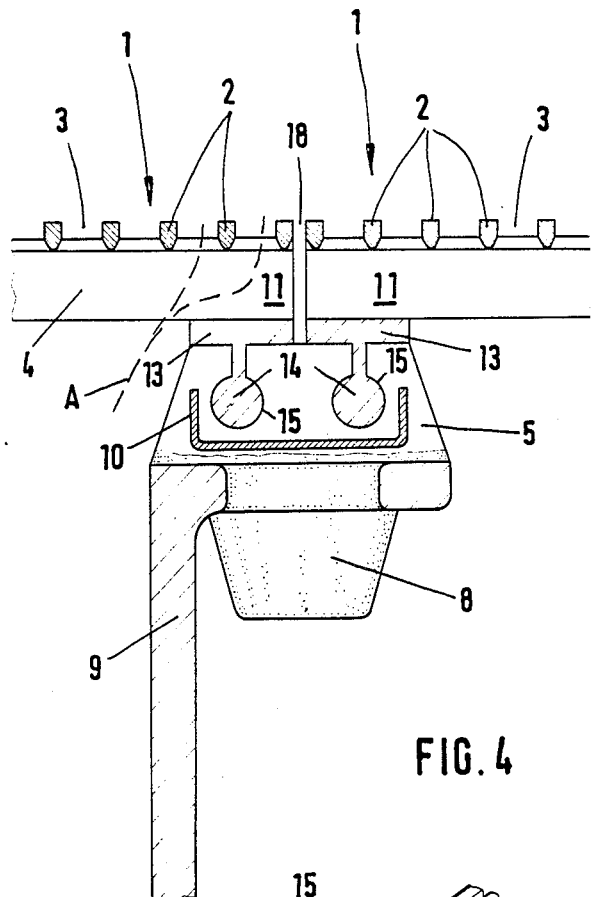
FIG. 4 shows a cross section of another embodiment of the screening apparatus in the area of two adjacent screen elements.

FIGS. 1 through 3 show sections of a screening apparatus with a screening grid including a large number of exchangeable screen elements 1. The screen elements 1 have a sifting surface with sifting holes 3 on their top sides, which are formed by rods 2 which lie in the direction of motion of the screen. These are metal rods which are welded onto separators 4 located beneath them. However, in place of the rods 2, perforated sheet-metal or other sifting sheets may be used.

The adjacent screen elements 1 are directly in contact with one another. As can be seen particularly in FIG. 1, the upper side of the sifting surfaces, which are in the same plane, complement one another to form a continuous, total sifting surface which is free of any upwardly-protruding elements such as attachment elements. The screen elements 1, the support sides of which are adjacent to one another, are boshed to the intermediate cross-pieces 5 by means of separators 4. For this purpose, the transverse rods 4 along their free lower edges have a thick protrusion 6 which may be pressed into a snap-groove 7 of the intermediate cross-piece 5 in a firm-locking and in a removable manner. The screen elements 1 have several transverse rods 4 below them, arranged at a distance from one another; the snap grooves 7 are arranged in transverse direction on the intermediate cross-pieces 5 at a corresponding distance from one another.

The intermediate cross-piece 5 is supported from below by a carrier-framework 9. Advantageously, it is connected removably with the horizontally recessed rail of the carrier-framework. For this purpose, it has a number of retaining anchors 8 underneath it, which protrude removably into corresponding bosh-holes of the carrier framework 9. The anchors 8 may also be continuous rods which are placed removably into slit-like openings. The entire intermediate cross-piece 5 including the anchors 8 is preferably made of a rubber-elastic plastic such as polyurethane, which has the kind of elasticity that will permit the screen elements 1 to be boshed on from the top side, and removed again, and also permit the retaining anchors 8 to be snap-connected to the carrier-framework 9.

In order for the intermediate cross-pieces 5 to have sufficient stiffness, particularly enough longitudinal stability, they have embedded therein steel inlays 10 in the longitudinal direction which in particular provide a constant partial separation between the retaining anchors 8.

It is particularly important that the distance downwards of the separators be measured in such a way that a passage-space 11 limited toward the bottom by the top side of the intermediate cross-piece 5, remains free under the rods in the longitudinal marginal area which forms the screen surface. This passage-space 11 opens toward the interior of the screen element 1, for which reason the sifted material passing trough the marginal sifting openings 3 is deflected inwardly, when seen from the longitudinal sides of the screen elements. In this way, the marginal supporting zone of the screen element 1 is also used as an active sifting surface, and the inward deflection of the sifted material may be fostered by a roof-shaped inclination of the top side 12 of the intermediate cross-piece 5 in the area which delimits the passage space 11 toward the bottom. The passage path for the sifted material passing through the sifting surface 2 in the area of the longitudinal edges is emphasized in the drawing by the dotted line marked "A".

Figure 5:
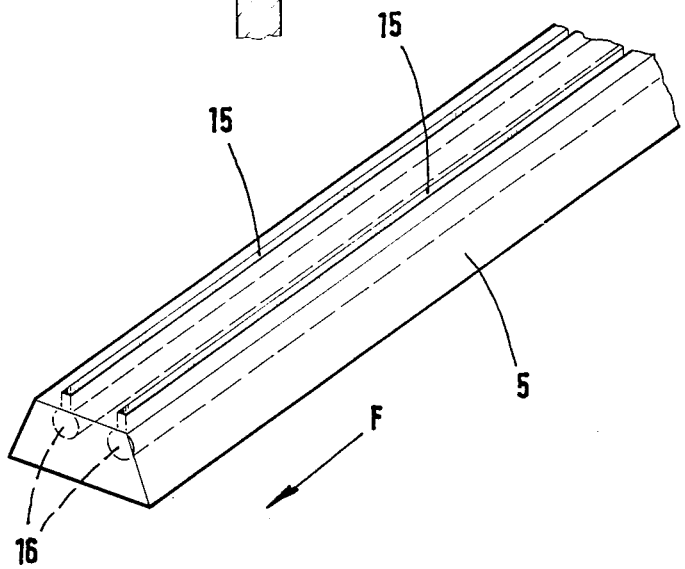
FIG. 5 shows a perspective top view of the intermediate cross-pieces for support of the screening grid on the carrier framework.

FIG. 4 shows an embodiment of a screening apparatus in which the sifting elements differ from the above-described design only in that they are not directly connected by their separators 4 to the intermediate cross-piece 5, but rather by means of retaining bars 13 at the bottom ends, which, when made in metal, are welded to the separators 4 and have snap-bosses 14 protruding from their bottoms. The intermediate cross-piece 5 has two snap-grooves 15 running parallel to one another at a certain distance for the purpose of receiving the screen elements 1, which border one another along their longitudinal edges. These snap-grooves 15 generally lie along the direction of movement of the sifting machine. In case of insufficient hold of the snap-boss 14 in the snap-groove 15 of the intermediate cross-piece 5, the danger exists that the screen elements 1 will move out of the cross-piece 5 due to the transport-component of the sifting machine. FIG. 5 shows how this is prevented. The snap-grooves 15 have, at least at their front ends F in the direction of motion, closed fronts 16, and the snap-bosses 14 of the snap-grooves 15 are formed in such a way that their fronts located in the frontal direction F of the direction of motion rest against the frontal wall of the cross-piece 5.

The passage space 11 under that sifting surface in the longitudinal support area is limited in this embodiment by the upper side of the retaining bars 13. Here, too, the top sides of the retaining bars 13 may be inclined inwardly and downwardly in a roof-like manner.

Figure 6:
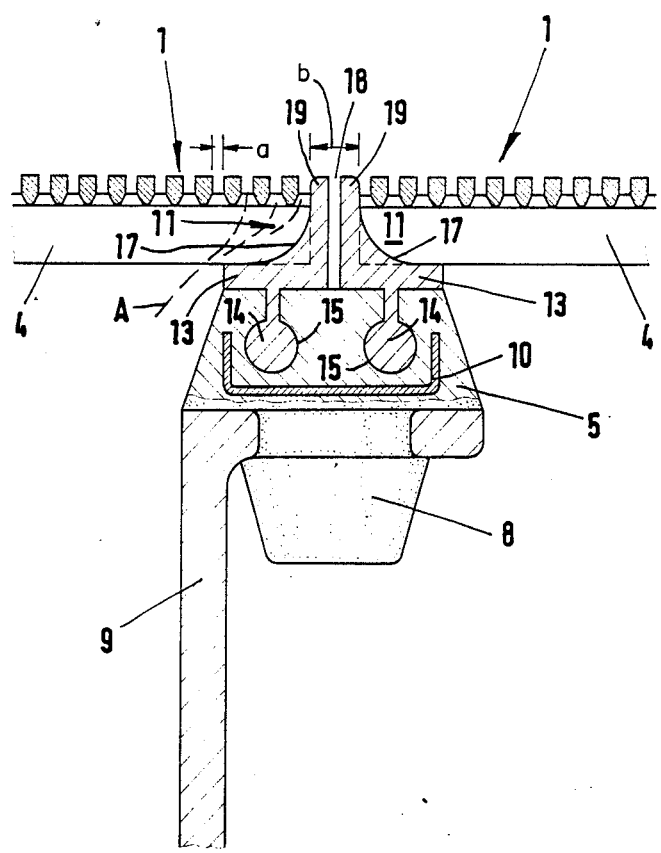
FIG. 6 shows a cross-section of a second embodiment of a screening apparatus in the area of two adjacent screen elements.

This is shown, for example in embodiment according to FIG. 6, where the top sides 17 of the retaining bars 13 have a concave arc falling off toward the inside of the screen elements 1.

The embodiment according to FIG. 6 differs from that shown in FIG. 4, in that vertical longitudinal walls 19 protruding upwards are installed at the outside longitudinal edges of the retaining bars 13, to which the separators 4 of the screen elements 1 fit tightly. As a result, the passage spaces 11 between the separators 4 are closed off to the outside in the longitudinal direction of the sifting screen elements 1 whereby the sifted material passing through the space 18 between adjoining screen elements 1 cannot escape by way of the passage space 11.

This is important if the width a of the sieve opening 3 is smaller than the maximum occurring space 18. Such would be the case if the space 18 was defined by width "b" as shown in FIG. 6. Otherwise, granules greater in size than the sieve openings 3 which are supposed to remain in the overflow, would escape through the space 18 into the sifted material. The process is different for the dimensions of the sieve openings 3 shown by reference to the embodiment of FIG. 4. Here, the sifting material passing between the adjacent screen elements 1 through the space 18 is negligible, because the width of the space 18 is smaller than the width of the screen openings 3. For this reason, it is in this case unnecessary to close off the passage spaces 11 above the retaining bars 13 towards the outside of the screen elements 1.

As is shown in the embodiments according to FIGS. 1, 2, 4, and 6, the screen elements 1 are arranged with their sifting surfaces substantially in one plane. The sifting surfaces of all screen elements 1 thus complement each other to form a continuous sifting surface of the screening apparatus which is not broken by any upwardly-protruding attachment means.

Figure 7:
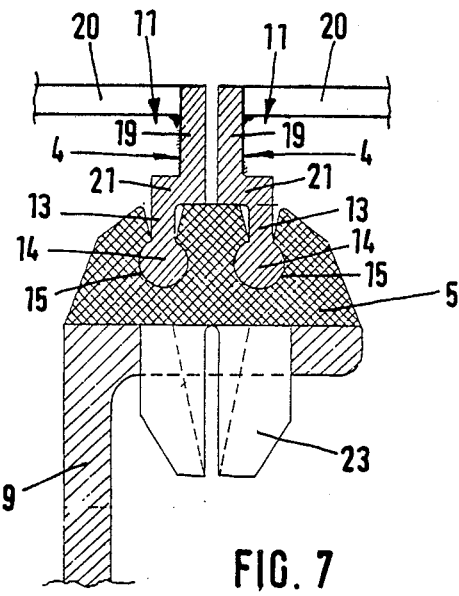
FIG. 7 shows a cross-section of a third embodiment of two adjacent screen elements in a screening apparatus according to the present invention.

FIG. 7 shows an embodiment in which the steel elements 20 are used as sifting elements. These may be either perforated sheet-metal or sieve-rods lying perpendicular to the direction of motion, with sieve openings inbetween. In the case of steel elements 20, the separators 4 are attached directly to the edges. The separators 4 consist here of a single piece incorporating the longitudinal wall 19 and the bar 13, which are connected with one another by an intermediate part 21. There, the retaining bar 13 extends downward from the longitudinal wall 19, and these two elements are positioned vertically in the usual use position. Since on the one hand, the longitudinal wall 19 forms the longitudinal edge boundary of the screen elements, and since on the other, the snap-grooves 15 of the cross piece 5 must have a sufficient separation, the retaining bar 13 must be installed so as to be parallel to the longitudinal wall 19 and displaced inwardly, to bridge the intermediate part 21. This intermediate part 21 is sufficiently separated from the underside of the steel elements 20 so that the passage space 11 is provided for the sifted material in the marginal supporting area.

Moreover, FIG. 7 shows that the intermediate cross-piece 5 may be connected removably to the carrier-framework 9 by means of expansion anchors 23 on its underside, in place of the above-described retaining anchors. The expansion pegs necessary for this purpose are not shown in the drawing.

In the embodiment according to FIG. 7, the steel elements 20 are placed internally and laterally against the longitudinal wall 19 of the separators 4.

Figure 8:
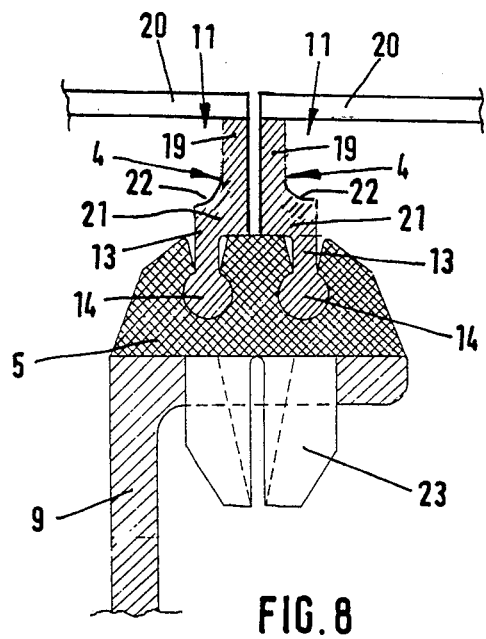
FIG. 8 shows a cross-section of a fourth embodiment of a screening apparatus in the area of two adjacent screen elements.

By contrast, FIG. 8 shows an additional embodiment in which the steel elements 20 are placed onto the top side of the longitudinal walls 19 of the separators 4. In order to promote a transfer of the passing sifted material under the sifting surface toward the inside, concave surface 22 is provided in the transitional area between the longitudinal walls 19 and the intermediate parts 21 of the separators 4. Moreover, here as in the embodiment according to FIG. 7, the steel elements 20 form a continuous, flat total surface with their top sides whose active sifting zones are interrupted only at the points of attachment of the separators 4.

I claim:

1. A screening apparatus with a screen grid comprising:
    a plurality of exchangeable screen elements placed adjacent each other to form said screen grid, each of said screen elements having longitudinal edges and a screen surface with screen openings therein, said screen surface having a top side and a bottom side;
    adjacent screen elements of said screen grid being placed along at least their longitudinal edges on intermediate cross-pieces, said intermediate cross-pieces being attached to a carrier-framework;
    said adjacent screen elements being placed in direct contact and flushed with each other in an end to end orientation to form a continuous screen surface of said screen grid; and
    plurality of separators for supporting said screen elements thereon and for removably mounting said screen elements on said intermediate cross-pieces, said separators being positioned transversely with respect to said intermediate cross-pieces;
    wherein said separators are protruding at such a distance from underneath said bottom side of said screen surface of a corresponding screen element to said intermediate cross-pieces that a passage space for passing the material being screened, is formed below said screen surface and between said separators, in an area of connection of said adjacent screen elements through said separator onto said intermediate cross-pieces.

2. A screening apparatus according to claim 1, wherein said separators include transverse rods placed underneath said screen elements and along said screen elements at a distance from one another, and wherein said passage space for passing the material being screened is formed under said screen surface between said transverse rod, and wherein said area of connection is open towards the center of said screen element.

3. A screening apparatus according to claim 1, wherein said separators include enlarged protrusions extending at their lower ends, and said intermediate cross-pieces include corresponding grooves which fit said protrusions.

4. A screening apparatus according to claim 1, wherein said passage space is limited by top sides of said intermediate cross-pieces which are inclined downwardly towards an opening-side of said passage space located below said bottom side of said screen surface.

5. A screening apparatus according to claim 1, wherein said separators are installed on retaining bars, wherein said retaining bars include snap-bosses and said intermediate cross-pieces include corresponding snap-grooves for receiving said snap-bosses, said snap-grooves extending in a longitudinal direction of said screen elements, said passage space being limited downwardly by said retaining bars.

6. A screening apparatus according to claim 5, wherein said separators and said retaining bars constitute a single piece.

7. A screening apparatus according to claim 6, wherein said snap-bosses of said retaining bars are longitudinally-extending, downwardly protruding bosh pegs, which fit into said longitudinal snap-grooves of said cross-pieces.

8. A screening apparatus according to claim 7, wherein the longitudinal direction of said screen elements is in the direction of movement (F) of the screened material, and the longitudinal snap-grooves of said intermediate cross-pieces have closed-off fronts, at least at their ends which are forward with respect to the direction of movement (F).

9. A screening apparatus according to claim 5, wherein said retaining bars have top sides which drop off towards said opening-side of said passage space.

10. A screening apparatus according to claim 1, wherein at least two adjacent screen elements are supported by a common intermediate cross-piece.

11. A screening apparatus according to claim 9, wherein a space formed between the at least longitudinal edges of the adjacent screen elements spaced on said intermediate cross-pieces is equal to the width of said screen openings in said screen elements.

12. A screening apparatus according to claim 9, wherein the width of said screen openings in said screen elements is smaller than the width of a space formed between the at least longitudinal edges of the adjacent screen elements placed on said intermediate cross-pieces, and said passage space is closed off at said edges of said adjacent screen elements, by a longitudinal wall attached to said separator.

13. A screening apparatus according to claim 12, wherein said longitudinal wall and said retaining bar are formed as a single piece.

14. A screening apparatus according to claim 13, wherein said separator includes a vertical, longitudinal wall and a retaining bar, which is fixed to said longitudinal wall, such as to be displaced inwardly towards the center of said screening element and parallel with respect to said wall, said retaining bar being connected to said longitudinal wall by an intermediate part.

15. A screening apparatus according to claim 14, wherein a steel element is placed onto said longitudinal wall of said separator at a distance from said intermediate part.

16. A screening apparatus according to claim 15, wherein a steel element is placed onto said longitudinal wall on the top of said intermediate part.

17. A screening apparatus according to claim 15, wherein said intermediate part has a hollow channel beginning at its side and facing upwardly, towards said bottom side of said screen element, said channel being connected to said longitudinal wall.

18. A screening apparatus according to claim 17, wherein said intermediate cross-pieces comprise a rubber-elastic plastic, and includes retaining anchors for connection to said carrier-framework.

19. A screening apparatus according to claim 18, wherein stiffening steel inlays are embedded into said intermediate cross-pieces.

20. A screening apparatus according to claim 19, wherein said screen element, said separators and said retaining bars are made of a single piece.

21. A screening apparatus according to claim 9, wherein a space formed between the at least longitudinal edges of said adjacent screen elements is narrower than the width of said screen openings.

22. A screening apparatus according to claim 18, wherein said retaining anchors are expansion anchors.

* * * * *